United States Patent [19]

Domas

[11] Patent Number: 4,639,017
[45] Date of Patent: Jan. 27, 1987

[54] OFFSET NIPPLE

[76] Inventor: Dennis R. Domas, 7328 N. 22nd St., Phoenix, Ariz. 85020

[21] Appl. No.: 812,942

[22] Filed: Dec. 24, 1985

[51] Int. Cl.[4] ............................................. F16L 37/26
[52] U.S. Cl. ..................................... 285/38; 285/179
[58] Field of Search .................. 285/39, 38, 179, 425, 285/30; 4/252 R, 211; 138/177, 178

[56] References Cited

U.S. PATENT DOCUMENTS

| 195,243 | 5/1963 | Kelly | D91/3 |
|---|---|---|---|
| 866,952 | 9/1907 | McKee | 285/30 |
| 1,267,651 | 5/1918 | Ford | 285/30 X |
| 1,355,678 | 10/1920 | Le Tarte | 285/30 |
| 1,840,046 | 1/1932 | McKee | 285/30 |
| 2,241,484 | 5/1941 | Sellers | 285/30 |
| 2,966,372 | 12/1960 | Phillips | 285/179 X |

*Primary Examiner*—Richard J. Scanlan, Jr.
*Attorney, Agent, or Firm*—Warren F. B. Lindsley

[57] ABSTRACT

An offset nipple or pipe fitting provided with grips to facilitate installation by hand in cramped quarters as typically encountered in the connection of a drain for a bath tub.

3 Claims, 7 Drawing Figures

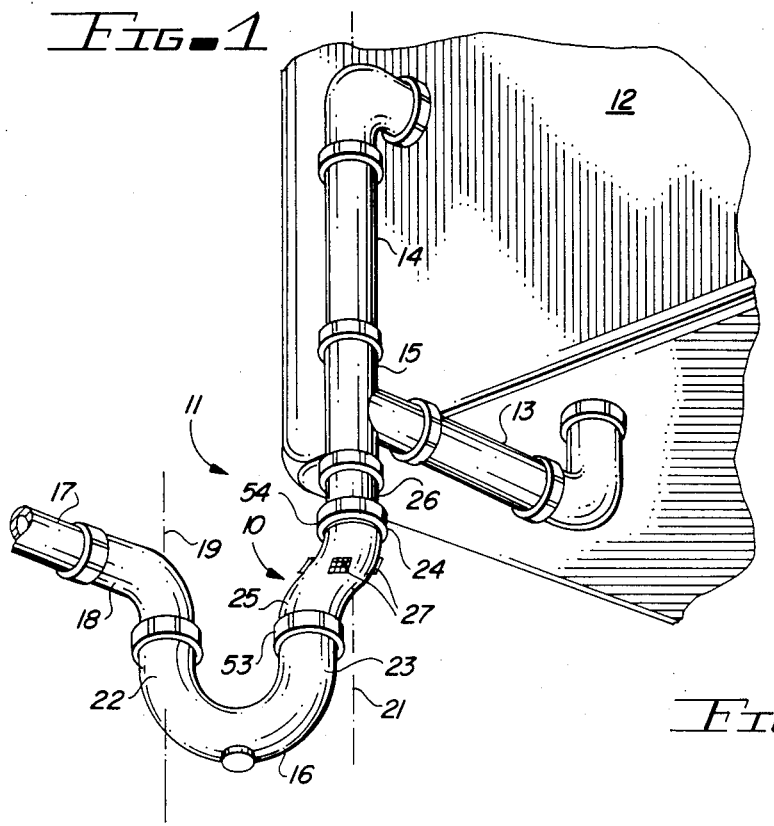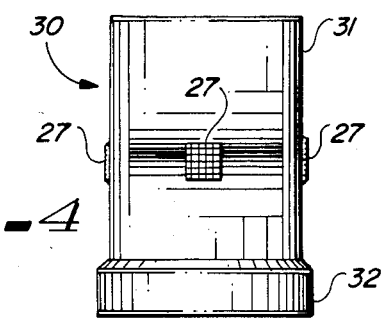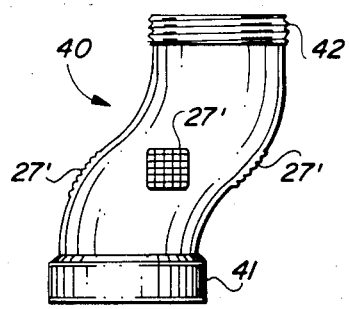

OFFSET NIPPLE

BACKGROUND OF THE INVENTION

One of the more difficult plumbing jobs is the installation of drain pipes for a bath tub. This operation, while appearing at first glance to present no real challenge in terms of complexity, is typically complicated by at least two circumstances.

The first complication is the relative inaccessibility of the work area. More often than not, bath tubs are installed in confined areas. Access to the plumbing fittings is often provided by means of small openings located at or below the floor surface. The plumber must work from a prone position, bending around corners straining to reach and having difficulty seeing the area in which he is working.

The second difficulty often arises from the lack of a proper alignment between the opening in the tub and the drain pipe to which it must be connected. Frequently neither the tub nor the drain pipe can be moved to correct the alignment, the position of the tub being constrained by the positions of the bathroom walls, and the pipe being cast in concrete.

Offset pipe sections of various types which have been offered in the past to accommodate the lack of alignment are indispensible for coping with such a situation, but they do not in their presently available form offer any significant relief for the accessibility problem.

Because the drain pipes at the tub encounter relatively low water pressure, the pipe fittings may be hand tightened. Moreover, because of the cramped quarters which severely limits the use of a wrench of any kind, hand tightening may prove the only resort. Smoothly fitting plastic pipe and associated fittings have facilitated such hand operations, but serious difficulties remain because the slick surfaces of the pipes are difficult to grip, especially when the hands are greasy or wet from perspiration.

Any further improvement in the design or structure of offset pipes which provides even a little relief from these vexing problems will be welcomed by those who have experienced the difficulties.

The present invention addresses such an improvement in the form of an offset pipe that is more easily installed by hand under the prevailing circumstances.

DESCRIPTION OF THE PRIOR ART

Offset nipples or pipe fittings are well known in the prior art.

U.S. Pat. No. 866,952 teaches the use of offset nipples in the connection of a gas meter.

U.S. Pat. No. 1,267,651 shows an offset nipple incorporated in a suspending and controlling header for a gas meter.

U.S. Pat. No. 1,355,678 describes the use of an offset nipple in a similar structure employed in the connection of a gas meter.

U.S. Pat. No. 1,840,046 describes still another gas meter connecting device employing an offset nipple.

U.S. Pat. No. 2,241,484 describes yet another application of offset nipples in a gas meter connection.

U.S. Pat. No. Des. 195,243 illustrates the design of an offset nipple threaded for connection at both ends.

While these prior art devices as illustrated will readily accommodate the connection of parallel but nonaligned pipes, they do not incorporate features intended to facilitate hand installation in cramped quarters.

SUMMARY OF THE INVENTION

In accordance with the invention claimed, an improved offset nipple or pipe fitting is provided in a form that facilitates its installation by hand in cramped quarters such as those typically encountered in the installation of drain pipes for bath tubs.

It is, therefore, an object of the present invention to provide an improved offset nipple or pipe fitting.

Another object of the invention is to provide such a pipe fitting in a form that is more easily installed by hand without the use of wrenches or other tools.

A further object of the invention is to provide such a pipe fitting in a form that is more readily installable in cramped quarters under conditions of poor visibility and limited access.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described with reference to the accompanying drawing, in which:

FIG. 1 is a perspective view showing the improved offset nipple or pipe fitting of the invention installed in the drain assembly of a bath tub;

FIG. 2 is a side view of a first embodiment of the offset nipple of the invention;

FIG. 3 is a perspective view of the offset nipple of FIGS. 1 and 2 as seen from one end;

FIG. 4 is another side view of the nipple of FIGS. 1, 2 and 3 as seen from an angle 90 degrees displaced from the viewing angle of FIG. 2;

FIG. 5 is a side view of a second variation of the offset nipple of the invention;

FIG. 6 is a side view of a third variation of the offset nipple of the invention; and FIG. 7 is a side view of a fourth variation of the invention.

DESCRIPTION OF THE PREFERRED EMBODIMENT

Referring more particularly to the drawing by characters of reference, FIG. 1 shows an improved offset nipple 10 of the invention installed in a drain assembly 11 of a bath tub 12.

The drain assembly 11 comprises a tub drain portion 13, an overflow portion 14, a "T"-shaped fitting 15 that serves as a junction for the drain and overflow portion, a U-shaped trap 16 that leads into the main drain or sewer pipe 17 via an "L"-shaped coupling 18 and the offset nipple 10 which couples the "T"-shaped fitting 15 to trap 16.

The utility of the offset nipple as a coupling means between two parallel but nonaligned pipes is readily apparent from an examination of FIG. 1. The "L"-shaped fitting or coupling 18 has its lower end directed vertically downward along a vertical line 19 while the vertical portions of the overflow portion 14 and "T"-shaped fitting 15 are concentric with a second vertical line 21 that is displaced from line 19. The U-shaped trap 16 has the general form of an inverted "U" and is pivotal about its left end 22 inside the open lower end of "L"-shaped fitting 18. As trap 16 is rotated about its left end, its right end 23 traces a circle about line 19. Similarly, offset nipple 10 has its upper end 24 pivotally connected to the lower end of "T"-shaped fitting 15. The lower end 25 of nipple 10, which is offset from upper end 24, traces a circle about line 21 as nipple 10 is rotated about its upper pivotal connection. The intersections of the circles thus traced by trap 16 and nipple 10 define points at which the mating ends of nipple 10 and trap 16 may be aligned and connected together. Correction for any elevational difference between the top of nipple 10 and the lower opening of fitting 15 is made by means of a short nipple 26.

As shown in FIG. 1, the offset nipple 10 of the invention forming inlet and outlet ports or ends interconnected by an arcuate portion is provided with hand grips 27 on its arcuate portion which may comprise any form of roughened or serrated surface, and is shown in FIG. 1, for example, in the form of raised striated pads. In the preferred embodiment, four roughened surfaces or pads are uniformly distributed about the body of the nipple at the four quadrants of its circular cross section, which may be midway of its length. The grips 27 permit a firm grip on the surface of the nipple by an installer even when his or her hands are wet or greasy. Rotation of nipple 10 by hand or holding of nipple 10 stationary by hand is thus facilitated by grips 27.

Grips 27 are also useful as points of reference for an installer who must sometimes work with limited visual access to the work area. It is frequently necessary to inspect such a work area visually and then to back off in order to perform the manual manipulations. Corrections in the rotational position of nipple 10 are facilitated under such circumstances by points of reference such as grips 27 which permit the installer to judge position and degree of rotation through his or her sense of touch.

The offset nipple of the invention is amenable to implementation in any of a number of forms. FIGS. 2, 3 and 4 illustrate a plastic offset nipple 30 adapted for connection to other plastic fittings by means of cemented joints. As in the case of the prior art offset nipples, the nipple is characterized by its typical dog-leg contours with top and bottom ends directed along mutually parallel but displaced straight lines. Top end 31 of nipple 30 is terminated in a short length of straight tubing having substantially the same inside and outside diameters as the plastic tubing with which the nipple is intended to be used. Bottom end 32 is flanged with an inside diameter that fits snugly over the outside periphery of the pipe and other fittings with which it is employed. In the cementing operation employed in joining plastic tubing and fittings of this type, the mating joints of the pipe and fitting are first coated with cement. The parts are then pressed together and rotated by hand to the desired position. Grips 27 which are again provided at the quadrant positions about the body of nipple 30 and which may be raised above the surface of the nipple, are useful under the difficult conditions described earlier during such a cementing operation.

Another variation of the offset nipple of the invention is shown in FIG. 5. Offset nipple 40 of FIG. 5 has a flange 41 at its lower end and a threaded termination 42 at its upper end. The lower end is again joined to a pipe or other fitting by cementing while the upper end is adapted for connection by means of a compression fitting. Again, the four grips 27' are provided for use in holding nipple 40 in position or for rotating it by hand during installation as well as for a tactile indication of its rotational position. In this embodiment, the outer surface of the nipple is serrated to form the grips 27'.

Offset nipple 50 of FIG. 7 has a straight cut-off termination 51 on top and a reduction 52 at its lower end. Both ends of nipple 50 are intended for cemented joints.

Nipple 10 incorporated in assembly 11 of FIG. 1 is again shown in FIG. 6 where details of its form are more clearly visible. As noted in FIG. 6, both ends of the nipple 10 are threaded to permit connection by means of compression rings 53 and 54 shown in FIG. 1. Compression washers inside rings 53 and 54 seal the joints between the ends of offset nipple 10 and the adjoining fittings as the rings are tightened upon threaded ends 55 and 56 of nipple 10.

It should be noted that the inventive concept may be used for any type of fluid transportation where nipple or pipe fitting arrangements are useful but is particularly useful in the application of combination waste and vent piping connections, Although but a few embodiments of the invention have been illustrated and described, it will be apparent to those skilled in the art that various changes and modifications may be made therein without departing from the spirit of the invention or from the scope of the appended claims.

What is claimed is:

1. An offset nipple for interconnecting two substantially parallel but nonaligned pipes in waste and vent connections comprising:
    a hollow pipe section distorted at each end to form inlet and outlet ports, said ports being interconnected by an arcuate portion,
    said arcuate portion having a roughened surface in the form of a raised pad on its outer periphery at each of the four quadrants of said arcuate portion for gripping by the installer when using it to interconnect said inlet and outlet ports with nonaligned pipes.

2. The offset nipple set forth in claim 1 wherein:
    said roughened surface at each of said quadrants is formed substantially midway of the length of said arcuate portion.

3. The offset nipple set forth in claim 1 wherein:
    each roughened surface comprises a serrated configuration.

* * * * *